US006775242B2

(12) United States Patent
Grilli et al.

(10) Patent No.: US 6,775,242 B2
(45) Date of Patent: Aug. 10, 2004

(54) METHOD AND APPARATUS FOR TIME-ALIGNING TRANSMISSIONS FROM MULTIPLE BASE STATIONS IN A CDMA COMMUNICATION SYSTEM

(75) Inventors: Francesco Grilli, Irvine, CA (US); Charles E. Wheatley, III, Del Mar, CA (US); Serge Willenegger, Onnens (CH); Parvathanathan Subrahmanya, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 136 days.

(21) Appl. No.: 09/901,831

(22) Filed: Jul. 9, 2001

(65) Prior Publication Data

US 2003/0007470 A1 Jan. 9, 2003

(51) Int. Cl.[7] .................. G01R 31/08; H04B 7/216; H04J 3/06
(52) U.S. Cl. .................. 370/252; 370/335; 370/509
(58) Field of Search .................. 370/209, 335, 370/252, 516, 342, 322, 333, 503, 509; 375/145, 354; 455/13.2, 517, 513

(56) References Cited

U.S. PATENT DOCUMENTS

| | | | | |
|---|---|---|---|---|
| 5,872,774 A | | 2/1999 | Wheatley, III et al. | 370/335 |
| 6,208,871 B1 | * | 3/2001 | Hall et al. | 455/517 |
| 6,259,683 B1 | * | 7/2001 | Sekine et al. | 370/328 |
| 6,526,039 B1 | * | 2/2003 | Dahlman et al. | 370/350 |

FOREIGN PATENT DOCUMENTS

| | | |
|---|---|---|
| WO | 9941854 | 9/1999 |
| WO | 0014907 | 3/2000 |

OTHER PUBLICATIONS

"Universal Mobile Telecommunications System (UMTS); Synchronization in UTRAN Stage 2 (3GPP TS 25.402 version 4.1.0 Release 4)" ETSI TS 125 402; Jun. 2001, pp. 1–44.

3rd Generation Partnership Project; Technical Specification Group Radio Access Network; Physical Layer– Measurements (FDD) (Release 4); 3GPP TS 25.215; Jun. 2001, pp. 1–18.

\* cited by examiner

*Primary Examiner*—Duc Ho
(74) *Attorney, Agent, or Firm*—Philip Wadsworth; Thien T. Nguyen; Thomas R. Rouse

(57) ABSTRACT

Schemes to time-align transmissions from multiple base stations to a terminal. To achieve time-alignment, differences between the arrival times of transmissions from the base stations, as observed at the terminal, are determined and provided to the system and used to adjust the timing at the base stations such that terminal-specific radio frames arrive at the terminal within a particular time window. In one scheme, a time difference between two base stations is partitioned into a frame-level time difference and a chip-level time difference. Whenever requested to perform and report time difference measurements, the terminal measures the chip-level timing for each candidate base station relative to a reference base station. Additionally, the terminal also measures the frame-level timing and includes this information in the time difference measurement only if required. Otherwise, the terminal sets the frame-level part to a predetermined value (e.g., zero).

42 Claims, 7 Drawing Sheets

Synchronous System Configuration (S1)

| BS #1 | 1201 | 1202 | 1203 | 1204 | 1205 | ••• |
|---|---|---|---|---|---|---|
| BS #2 | 1201 | 1202 | 1203 | 1204 | 1205 | ••• |
| BS #3 | 1201 | 1202 | 1203 | 1204 | 1205 | ••• |

Synchronous System Configuration (S2)

| BS #1 | 201 | 202 | 203 | 204 | 205 | ••• |
|---|---|---|---|---|---|---|
| BS #2 | 1157 | 1158 | 1159 | 1160 | 1161 | ••• |
| BS #3 | 3201 | 3202 | 3203 | 3204 | 3205 | ••• |

METHOD AND APPARATUS FOR TIME-ALIGNING TRANSMISSIONS FROM MULTIPLE BASE STATIONS IN A CDMA COMMUNICATION SYSTEM

BACKGROUND

1. Field

The present invention relates generally to data communication, and more specifically to techniques for time-aligning transmissions from multiple base stations in a CDMA communication system.

2. Background

Wireless communication systems are widely deployed to provide various types of communication including voice and packet data services. These systems may be based on code division multiple access (CDMA), time division multiple access (TDMA), or some other multiple access techniques. CDMA systems may provide certain advantages over other types of system, including increased system capacity. A CDMA system is typically designed to conform to one or more standards, such as IS-95, cdma2000, and W-CDMA standards, which are known in the art and incorporated herein by reference.

A CDMA system may be operated to support voice and data communication. During a communication session (e.g., a voice call), a terminal may be in active communication with one or more base stations, which are placed in an "active set" of the terminal. While in soft handover (or soft handoff), the terminal concurrently communicates with multiple base stations, which can provide diversity against deleterious path effects. The terminal may also receive signals from one or more other base stations for other types of transmission such as, for example, pilot references, pages, broadcast messages, and so on.

In accordance with the W-CDMA standard, the base stations are not required to be operated synchronously. When operated asynchronously, from a terminal's perspective, the timing (and thus, the radio frames) of the base stations may not be aligned and the reference time of each base station may be different from those of the other base stations.

While in soft handover, a terminal concurrently receives data transmissions (i.e., radio frames) from multiple base stations. To ensure that the radio frames arrive at the terminal within a particular time window so that they can be properly processed and recovered, the W-CDMA standard provides a mechanism whereby the starting time of the terminal-specific radio frames from each base station to the terminal can be adjusted. Typically, before a new base station is added to the terminal's active set, this base station's timing relative to that of a reference base station is determined by the terminal and reported to the system. The system then instructs the new base station to adjust its transmit timing for the terminal such that the radio frames transmitted from this new base station are approximately aligned in time to the radio frames from the other active base stations.

For the W-CDMA standard, the time difference between a new candidate base station and a reference base station can be reported via an "SFN-SFN observed time difference type 1 measurement" (where SFN denotes system frame number). This measurement includes two parts. The first part provides the chip-level timing between the two base stations, which can be derived by detecting the timing of the pseudo-noise (PN) sequences used to descramble the downlink signals from these base stations. The second part provides the frame-level timing between the two base stations, which can be derived by processing (i.e., demodulating and decoding) a broadcast channel transmitted by the base stations. These two parts are encapsulated into a report message that is transmitted from the terminal to the system.

In certain W-CDMA system configurations, only the chip-level timing is required to properly time-align the radio frames of a newly added base station. This may be true, for example, if the base stations are operated synchronously and the frame-level timing is already known by the system. In this case, requiring the terminal to measure and report the frame-level timing as well as the chip-level timing (as required by the current W-CDMA standard) may degrade performance. First, if the terminal is forced to process the broadcast channel of a candidate base station before that base station can be selected for communication, then the soft handover region may be limited to only a portion of the base station's coverage area and would be bounded by where the broadcast channel may be received. Second, the processing of the broadcast channel leads to additional delays, which may degrade performance.

There is therefore a need in the art for techniques to time-align transmissions from multiple base stations to a terminal. One such technique is to provide the required time difference (i.e., only chip-level timing or both chip-level and frame-level timing) from a terminal in a W-CDMA system for handover and other applications.

SUMMARY

Aspects of the invention provide various schemes to time-align data transmissions from multiple base stations to a terminal. To achieve the time-alignment, time differences between the arrival times of transmissions from the base stations, as observed at the terminal, are determined and provided to the system. The system then uses the timing information to adjust the timing at the base stations such that the terminal-specific radio frames transmitted from the base stations arrive at the terminal within a particular time window.

In a first scheme, a time difference between two base stations is partitioned into a "fine-resolution" part and a "coarse-resolution" part, and only the required part(s) are reported when requested. For the W-CDMA system, an SFN-SFN type 1 measurement can be partitioned into a frame-level time difference and a chip-level time difference. Whenever requested to perform and report time difference measurements for a list of one or more base stations, the terminal measures the chip-level timing for each base station in the list relative to a reference base station. Additionally, the terminal also measures the frame-level timing and includes this information in the SFN-SFN type 1 measurement only if required (e.g., as directed by the system). Otherwise, if the frame-level timing is not required, the terminal can set the frame-level part to a predetermined value, which may be a known fixed value (e.g., zero), any arbitrary value selected by the terminal and which may be ignored by the system, a value for the frame-level timing already known in advance by various means (e.g., past measurements of the same cell, transmissions from the system, and so on), or some other value.

In a second scheme, the time difference between two base stations is determined by the terminal based on partial decoding of some of the base stations received by the terminal. For the W-CDMA system, the terminal can decode a primary common control channel (P-CCPCH) for a number of base stations, which may be selected based on a particular criterion (e.g., the received signal strength). If a particular number of (e.g., two or more) decoded base stations have the same system frame number (SFN) value at a particular time instance, then a synchronous system configuration may be deduced by the terminal, and the chip-level timing but not frame-level timing is determined for the remaining base stations.

In a third scheme, the timing for the terminal is ascertained by the base stations based on an uplink transmission from the terminal. The timing information recovered by the system may then be used to adjust the timing of the downlink transmissions to the terminal.

In a fourth scheme, the time difference between two base stations is ascertained by the system based on a priori knowledge of the layout and sizes of the cells in the system. If the coverage areas of the base stations are sufficiently small, then the time uncertainty due to signal propagation delays is also small (e.g., a few chips or less). For the W-CDMA system, the time difference between a common channel frame and a dedicated channel frame may be determined (e.g., for the reference base station), and all other base stations may be associated with the same time difference between their common and dedicated channel frames.

The above schemes may be used for various applications such as hard and soft handovers, position determination, and possibly other applications. The invention further provides methods, terminal, base station, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 2A through 2D are diagrams illustrating three different synchronous system configurations and an asynchronous system configuration;

DETAILED DESCRIPTION

Figure 1:
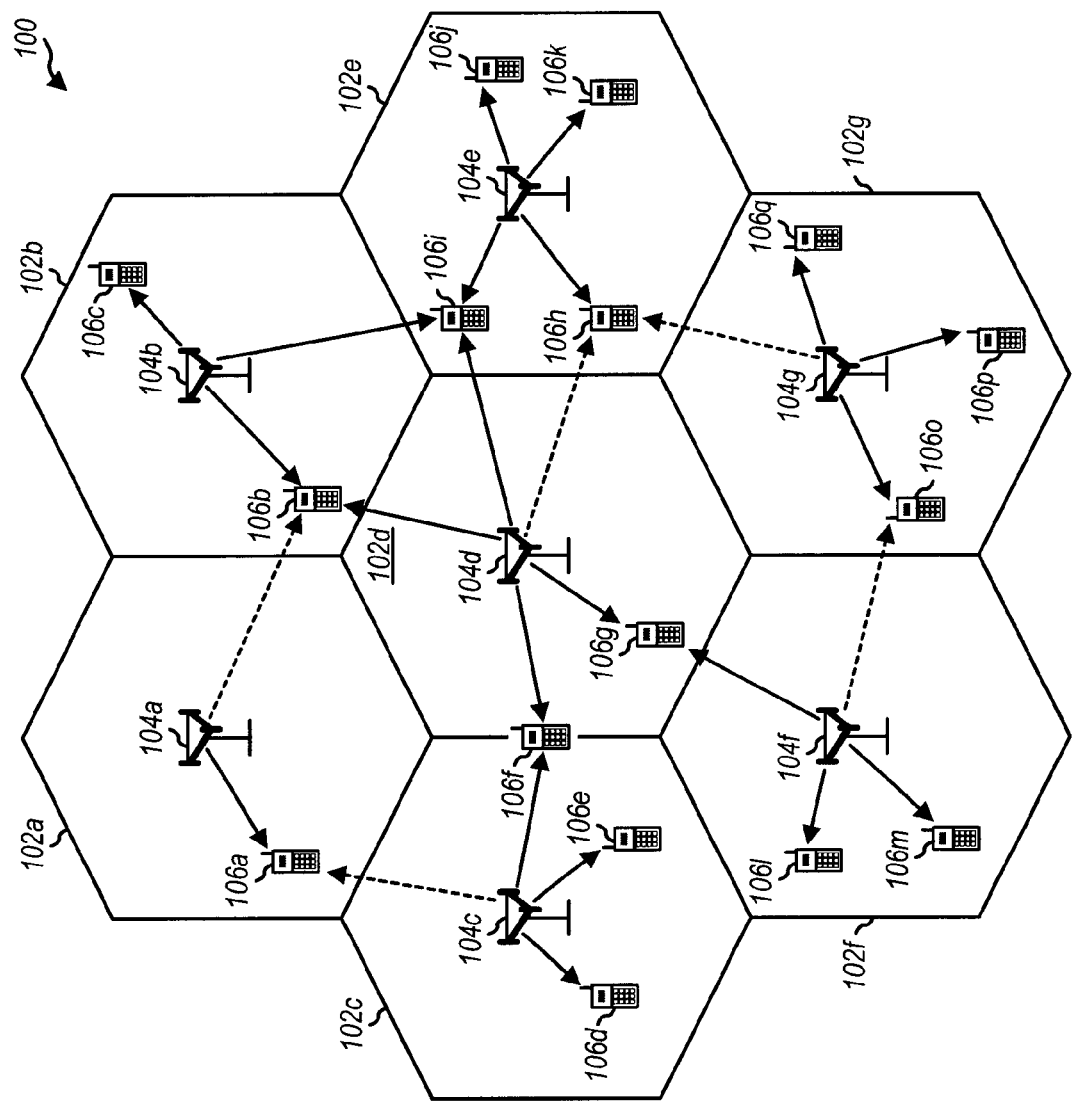
FIG. 1 is a diagram of a wireless communication system that supports a number of users and is capable of implementing various aspects of the invention.

FIG. 1 is a diagram of a wireless communication system 100 that supports a number of users and is capable of implementing various aspects of the invention. System 100 includes a number of base stations 104 that provide coverage for a number of geographic regions 102. The base station is also commonly referred to as a base transceiver system (BTS), and the base station and its coverage area are often collectively referred to as a cell. System 100 may be designed to implement one or more CDMA standards, such as the IS-95, W-CDMA, cdma2000, and other standards, or a combination thereof.

As shown in FIG. 1, various terminals 106 are dispersed throughout the system. In an embodiment, each terminal 106 may communicate with one or more base stations 104 on the downlink and uplink at any given moment, depending on whether or not the terminal is active and whether or not it is in soft handover. The downlink (i.e., forward link) refers to transmission from the base station to the terminal, and the uplink (i.e., reverse link) refers to transmission from the terminal to the base station.

As shown in FIG. 1, base station 104a transmits to terminal 106a on the downlink, base station 104b transmits to terminals 106b, 106c, and 106i, base station 104c transmits to terminals 106d, 106e, and 106f, and so on. In FIG. 1, the solid line with the arrow indicates a user-specific data transmission from the base station to the terminal. A broken line with the arrow indicates that the terminal is receiving pilot and other signaling, but no user-specific data transmission, from the base station. As shown in FIG. 1, terminals 106b, 106f, 106g, and 106i are in soft handover, and each of these terminals concurrently communicates with multiple base stations. The uplink communication is not shown in FIG. 1 for simplicity.

Each terminal is associated with an active set that includes a list of one or more "active" base stations with which the terminal communicates. These active base station(s) concurrently transmit radio frames to the terminal, and the transmission from each active base station is referred to as a Radio Link in the W-CDMA terminology. One of the base stations in the active set is designated as a reference base station. For example, the terminal may designate the base station with the strongest received signal as the reference base station, or the system may indicate which is the reference base station in a common message or a dedicated message.

In accordance with the W-CDMA standard, the base stations in the system may be operated such that they are all synchronized to each other, or they may be operated such that they are asynchronous to each other. This choice of synchronous or asynchronous operation is dependent on the manner in which the system is operated by a network operator. A W-CDMA system may also be operated such that some of the base stations are synchronized while other base stations are not synchronized. Various possible configurations for the base stations in the system are described below.

FIG. 2A is a diagram illustrating a first system configuration (S1) in which a number of base stations (e.g., three in this example) are operated synchronously with time-aligned frame start and numbering. For this configuration, the radio frames on the common channels (i.e., common channel frames) for the base stations start at approximately the same time for each frame (i.e., at $t_n$, $t_{n+1}$, and so on). The common channels are channels used to transmit information to all terminals, and typically include the paging channel, broadcast channel, and so on. The synchronization between the base stations is denoted by the time relationship between the common channel frames for the base stations being approximately constant in time, except for possibly small fluctuations around a nominal value. In this configuration, the system frame number (SFN) values for the common channel frames at any given time instance are the same for all three base stations.

FIG. 2B is a diagram illustrating a second system configuration (S2) in which a number of base stations are also operated synchronously with time-aligned frame start but non-aligned frame numbering. In this configuration, the common channel frames from the base stations start at approximately the same time. However, the SFN values for the common channel frames at any given time instance may not be the same for all base stations.

Figure 2C:
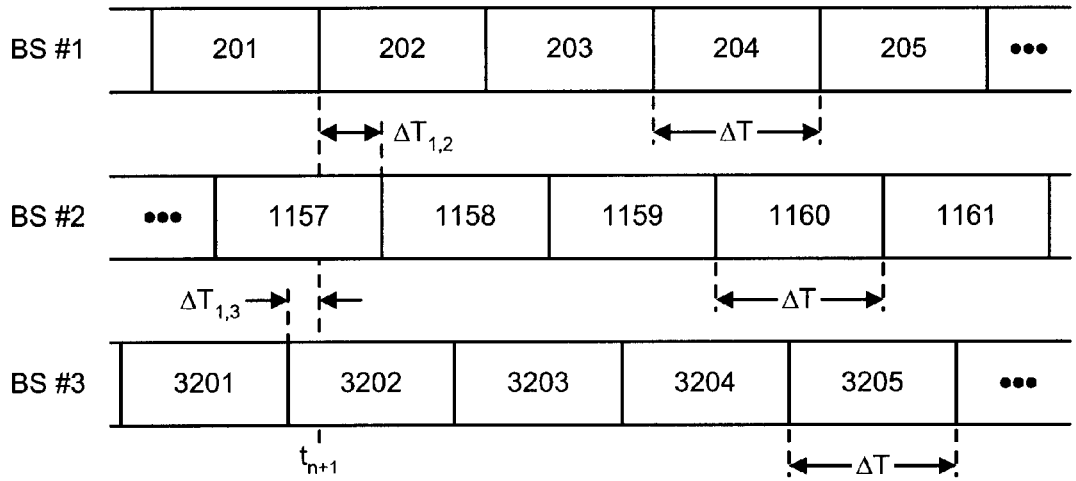

FIG. 2C is a diagram illustrating a third system configuration (S3) in which a number of base stations are operated synchronously but with non-aligned frame start and numbering. In this configuration, the common channel frames from the base stations do not start at the same time but are instead offset from one another by some (constant) values. Consequently, the SFN values for the common channel frames at any given time instance may not be the same for all base stations.

As used herein, a "synchronous configuration" includes any configuration in which the system has knowledge of the relative timing difference between the base stations to some desired degree of accuracy. The base stations may or may not be operated based on different unsynchronized clocks. However, if the system has some means to determine the relative timing difference between the base stations (e.g., through explicit measurements, or implicitly if it is known a priori that the base stations are synchronized), then the base stations may be deemed to be operated in the synchronous configuration.

Figure 2D:
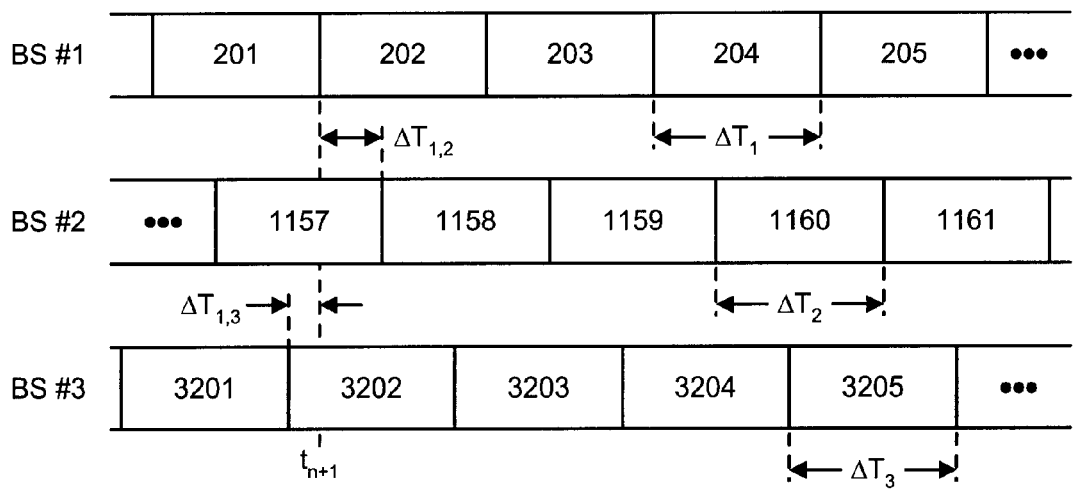

FIG. 2D is a diagram illustrating a fourth system configuration (A1) in which a number of base stations are operated asynchronously. In this configuration, the base stations are not synchronized and the time relationship between the common channel frames for these base stations drifts over time. The common channels for each base station are typically aligned to each other, but not to those of the other base stations. The long-term average value of this drift may be zero or may be some non-zero value (i.e., the time difference between the base stations may continually increase or decrease). Because of the asynchronous operation, the common channels for these base stations are not likely to start at the same time (unless by coincidence). Moreover, the SFN values for the common channel frames at any given time instance are not likely to be the same for all base stations.

For soft handover in an asynchronous configuration such as that shown in FIG. 2D, the transmissions from multiple base stations are not synchronized, and the user-specific radio frames for a given terminal are likely to be transmitted by the base stations starting at different times (unless they are time compensated). Moreover, the propagation time of the transmission from each base station may be unique and is dependent on the distance between that base station and the terminal. Thus, the user-specific transmissions from different base stations are likely to be received by the terminal at different times (again, unless time compensated). (For the W-CDMA system, only the user-specific data transmissions are time compensated, but not the transmissions on the common channels.)

For the asynchronous configuration shown in FIG. 2D, the radio frames (1158, 1159, . . . ) received from base station 2 are offset in time by $\Delta T_{1,2}$ from the radio frames (202, 203, . . . ) received from base station 1, where $\Delta T_{1,2}$ can be a positive or negative value depending on whether the start of a designated frame from base station 2 is earlier or later than the start of another designated frame from base station 1. Similarly, the radio frames (3202, 3203, . . . ) received from base station 3 are offset by $\Delta T_{1,3}$ from the radio frames received from base station 1. The time differences or offsets, $\Delta T_{1,2}$ and $\Delta T_{1,3}$, are not defined by a particular relationship and may further vary from frame to frame. In general, for an asynchronous system configuration, the time difference $\Delta T_{X,Y}$ can take on any (random) values since (1) the base stations transmit asynchronously without a defined timing relationship and (2) the propagation times from the base stations to the terminal are variable and dependent in part on the terminal's position.

For some functions, it is useful or necessary to know the arrival times of the (common) transmissions from multiple base stations. The signal arrival times, as measured at the terminal, can then be used to compute the time differences between the transmissions received from various base stations. The time differences can then be used for various functions, such as for hard and soft handovers.

Soft handover processing entails evaluating one or more new candidate base stations for inclusion in the active set of a terminal. To facilitate soft handover in the W-CDMA system, the terminal (i.e., a User Equipment (UE) in W-CDMA terminology) reports to the communication system (i.e., the UMTS Radio Access Network (UTRAN) in W-CDMA terminology) a time difference measurement and a signal quality measurement for each new candidate base station to be considered for inclusion in the terminal's active set. The signal quality measurement may be used to decide whether or not to include the candidate base station in the terminal's active set. And the time difference measurement can be used to adjust the timing of the data transmission to the terminal, as described below.

Hard handover processing entails replacing the current active set for a terminal with a new potentially disjoint active set on the same or different frequency. The system determines the relative time difference between the common and dedicated frames for all members of the new active set, even if the new active set is composed of a single base station. The reference base station for the new active set is typically indicated in a message sent to the terminal for hard handover.

The time difference is typically measured between a new candidate base station and the reference base station. The reference base station is a specific base station in the active set that is designated as such by the terminal or by the system. If the terminal is not already in active communication with the system (i.e., not already in dedicated channels), then the reference base station is the one on which the terminal is currently "camped", i.e., the base station from which the terminal is receiving its broadcast channels and toward which it is sending the measurements required before the setup of dedicated channels, which is usually done directly in handover.

For each new candidate base station selected for inclusion in the terminal's active set (whether for hard or soft handover), the system can instruct the new base station to compensate its timing for the terminal such that the radio frames transmitted by this new base station on a dedicated physical channel (DPCH) will reach the terminal at approximately the same time as the radio frames transmitted by other base stations in the terminal's active set (i.e., the current active base stations) on their respective DPCHs. In essence, the timing of the user-specific radio frames on the DPCH from each active base station for the terminal is shifted relative to the timing of radio frames on the base station's common channels to achieve similar arrival times for the radio frames on the DPCHs for all active base stations.

The timing compensation performed at the active base stations approximately aligns the start of the radio frames from these base stations, as received at the terminal, to a particular time window (which may span, e.g., a few chips). With the timing compensation, the user-specific radio frames on the DPCHs (i.e., dedicated channel frames) from all active base stations are approximately aligned even though their common channel frames may be received at different times due to different transmit times and different propagation delays. In this way, the terminal can process multiple signal instances from all transmitting base stations within a smaller defined window (e.g., 256 chips). If the time difference between the downlink DPCH and the downlink common channels for a particular candidate base station cannot be determined then, in accordance with the current W-CDMA standard, it may not be possible for the system to add the candidate base station to the terminal's active set.

The time difference between each candidate base station and the reference base station for handover is specific to the terminal. Typically, a coarse time difference measurement (e.g., one chip or worse resolution) is adequate for handover.

The time difference between two base stations may be measured or estimated based on various types of transmissions from these base stations. The W-CDMA standard defines a (logical) broadcast control channel (BCCH) that is mapped to a (transport) broadcast channel (BCH), which is further mapped to a (physical) primary common control channel (P-CCPCH). The broadcast control channel is a higher layer channel that is used to broadcast messages to the terminals in the system. The broadcast messages are encoded in 20 milli-second (msec or ms) transport blocks, which are then transmitted in (10 ms) radio frames on the P-CCPCH. In W-CDMA, 20 ms is the interleaver size, which is also referred to as the Transmission Time Interval (TTI). Since a transport block is 20 ms long, the number included in each radio frame is not the real SFN value, but derived from an SFNPrime, i.e., SFN=SFNprime for the first 10 ms frame of the 20 ms TTI and SFN=SFNprime+1 for the last 10 ms frame of the 20 ms TTI. The start of the transmitted radio frames may be determined by processing the SCH and/or CPICH and these frame start times may then be used as the signal arrival times for the base stations. The broadcast channel on the P-CCPCH can further be processed (e.g., demodulated and processed) to recover the system frame numbers of the transmitted common channel frames. Typically, the time difference between two base stations is determined based on the signal arrival times of the earliest multipaths for these base stations.

In accordance with the W-CDMA standard, the time difference between two base stations may be measured by a terminal and reported to the system via various types of messages. The W-CDMA standard defines an SFN-SFN measurement, which is indicative of the time offset $\Delta T_{X,Y}$ in FIG. 2D. This measurement can be made by the terminal and sent to the system so that the transmission from a new base station may be compensated as part of the handover process. Several types of SFN-SFN measurement are supported by the W-CDMA standard, as briefly described below.

An "SFN-SFN observed time difference type 1 measurement" (or more simply, "SFN-SFN type 1 measurement") can be used to report the observed time difference between a new candidate base station and the reference base station. This measurement includes both frame-level timing and chip-level timing, which may be obtained by processing the broadcast channel and the P-CCPCH, respectively. The broadcast channel and P-CCPCH are described in further detail in Document Nos. 3GPP TS 25.133, 25.305, and 25.331, all of which are publicly available from the 3GPP organization and are incorporated herein by reference.

To perform an SFN-SFN type 1 measurement for a new candidate base station, the terminal initially processes the SCH and/or CPICH to recover the chip-level time difference between the candidate base station and the reference base station. This chip-level time difference is indicative of the difference between the start of the common channel frames from these two base stations, and may be determined based on the timing of the pseudo-noise (PN) sequences used to descramble the CPICH. The chip-level time difference has a range of [0 . . . 38,399] chips, which is one full frame.

To obtain the frame-level timing, the terminal processes (e.g., demodulates and decodes) the broadcast channels from the candidate base stations (and the reference base station, if it is not already known to the terminal) to retrieve the number of the common channel frames at a particular time instance. For each base station to be reported, the terminal processes 20 ms or more of the broadcast control channel (BCCH) since the Transmission Time Interval (TTI) that includes the SFN information (SFNPrime) is 20 ms long. The terminal then determines the difference in the system frame numbers for these base stations.

The observed SFN and chip differences are then combined by taking the modulo 256 of the SFN difference, scaling the modulo result by 38,400, and adding the scaled value to the chip-level timing difference, where 38,400 represents the number of chips within a 10 ms radio frame. The combined result is a value that falls within a range of [0 . . . 256·38,400−1] chips, where 256 represent the maximum value for the SFN difference after the modulo 256 operation and is in units of frames. The time difference between the candidate and reference base stations may thus be reported with a resolution of one chip. The SFN-SFN type 1 measurement is described in further detail in Document Nos. 3GPP TS 25.133 and 25.331 (Section 10.3.7.63).

An "SFN-SFN observed time difference type 2 measurement" (or more simply, "SFN-SFN type 2 measurement") can also be used to report the observed time difference between a candidate base station and the reference base station, and includes only chip-level timing. The terminal determines the difference in the chip-level timing between these base stations to a finer resolution (e.g., between ½ chip to ¹⁄₁₆ chip resolution). The observed chip-level time difference is then represented by a value that falls within a range of [−1280 . . . 1280] chips. For the SFN-SFN type 2 measurement, the terminal does not need to determine the system frame number for the candidate base station.

To add a candidate base station to the active set of a terminal for handover, the observed time difference between the common channel frames for the candidate and reference base stations may be measured by the terminal and reported to the system. This observed time difference can be provided to the system via an SFN-SFN type 1 measurement report message. In order to assist the handover process, the full range of the SFN-SFN type 1 measurement is provided by the terminal in the report message. This full range includes the frame-level time difference plus the chip-level time difference.

The use of the SFN-SFN type 1 measurement to report the time difference for a candidate base station for handover may be less than optimal for various situations, especially for system configurations wherein the frame-level timing is not needed. For the system configurations S1, S2, and S3 shown in FIGS. 2A, 2B, and 2C, the base stations are synchronous and the frame-level timing for the base stations is typically known by the system. For these system configurations, it is only necessary to report the chip-level timing to the system. And for system configuration S1, the time difference is primarily due to the different distances to the base stations and the small time inaccuracies of the base station synchronization.

However, for the SFN-SFN type 1 measurement as currently defined by the W-CDMA standard, both the frame-level timing and the chip-level timing need to be determined and reported by the terminal. To determine the frame-level timing, the common radio frame on the broadcast channel of the candidate base station needs to be demodulated, decoded, and recovered by the terminal, and this may be undesirable for several reasons. First, if the broadcast channel of a candidate base station needs to be recovered for the base station to be reported and considered for possible handover, then the handover region may be limited to only the region where the broadcast channel can be recovered, which may be only a portion of the total region covered by the candidate base station. Second, the processing of the broadcast channel results in additional delays (20 ms or more for each measured base station) that can prolong the handover process and degrade performance. Thus, it is undesirable to use the SFN-SFN type 1 measurement (as currently defined by the W-CDMA standard) to report the time difference for a candidate base station if the frame-level timing is not required.

In system configurations where the frame-level timing is not required by the system, only the chip-level timing needs to be reported for the time difference. This chip offset may be reported using the SFN-SFN type 2 measurement defined by the W-CDMA standard.

However, the use of the SFN-SFN type 2 measurement to report the chip-level timing for handover may also be undesirable for various situations. For the SFN-SFN type 2 measurement, the specified resolution is 1/16 of a chip and the accuracy requirements range from ½ chip (as currently defined by the W-CDMA standard) to 1/16 chip or possibly better (for future revisions of the W-CDMA standard). To obtain the more accurate sub-chip resolution, more complicated and/or prolonged search and acquisition procedures may be required.

Moreover, the SFN-SFN type 2 measurement is originally intended to be used for position determination, and its use for reporting time difference for handover functions may result in some undesirable consequences. According to the current W-CDMA standard, the SFN-SFN type 2 measurement is only reported inside OTDOA messages. (OTDOA or observed time difference of arrival is a position location technique used in W-CDMA, which is similar to the E-OTD or enhanced observed time difference position location technique used in cdma2000). Thus, some OTDOA-related messages may be exchanged as a result of requesting the terminal to send the SFN-SFN type 2 measurement. Also, the SFN-SFN type 2 measurement may be supported by only terminals that support OTDOA and not by all terminals deployed in the field. Thus, the SFN-SFN type 2 measurement cannot be relied upon for reporting chip-level timing for handover since some terminals may not support the measurement.

Aspects of the invention provide various schemes to time-align data transmissions from multiple base stations to a terminal. To achieve the time-alignment, the time differences between the arrival times of the downlink signals transmitted from the base stations, as observed at the terminal, are determined and provided to the system (e.g., the UTRAN). The system then uses the timing information to adjust the timing at the base stations such that the user-specific radio frames transmitted from the base stations arrive at the terminal within a particular time window. Several schemes are described in detail below, and other schemes may also be implemented and are within the scope of the invention.

In a first time-alignment scheme, the time difference between two base stations is partitioned into two parts, and only the required part(s) are reported. For the W-CDMA system, the SFN-SFN type 1 measurement can be partitioned into the frame-level timing and the chip-level timing, as described above. Whenever requested to perform and report time difference measurements for a list of one or more base stations, the terminal measures and reports the chip-level timing for each base station in the list. Additionally, the terminal also measures and reports the frame-level timing and includes this information in the SFN-SFN type 1 measurement only if required (e.g., as directed by the system). Otherwise, if the frame-level timing is not required, the terminal can set the frame-level part to a predetermined value. The predetermined value may be a known fixed value (e.g., zero), any arbitrary value selected by the terminal and which may be ignored by the system, a value for the frame-level timing derived from or known in advance by various means (e.g., previous measurements of the same base station, transmissions from the system, and so on), or some other value.

As shown in FIGS. 2A through 2D, the system can be operated based on one or more system configurations. The system may also be operated such that some of the base stations are operated synchronously while others are operated asynchronously. For synchronous configurations such as those shown in FIGS. 2A through 2C, the frame-level timing is typically already known by the system and does not need to be reported by the terminal when requested to perform and report time difference measurements. For synchronous base stations having fixed frame-level timing that is already known by the system, the frame-level timing need not be measured by the terminal.

In an embodiment, information may be provided to specifically identify the base stations for which frame-level timing is not required. For simplicity, these base stations are referred to as "synchronous base stations" regardless of whether or not they are actually operated synchronously. All other base stations for which frame-level timing is required are referred to as "asynchronous base stations" regardless of whether or not they are actually operated asynchronously. Using this information, frame-level time difference measurements are not made by the terminal when not required, and the selective omission of these measurements can provide various benefits described below.

In one embodiment, the identities of the synchronous base stations are provided by the system to the terminal via user-specific messages. For the W-CDMA system, a "measurement control" message is sent to the terminal each time a time difference measurement is to be performed and reported. (A set of "default" measurements is defined in the System Information, sent on common channels, and is used by default unless a measurement control message is received.) The measurement control message includes a list of base stations for which time difference measurements are requested. This list may include the current active base stations and/or the neighbor base stations, which are potential candidate base stations for handover. For each base station in the list, the measurement control message can be configured to include an indication of whether or not frame-level timing is required for the base station. In one specific implementation, this indicator is the "Read SFN Indicator" defined by the W-CDMA standard, which may be set to True if frame-level timing is required and set to False otherwise. By recovering the Read SFN Indicator for each base station in the list, the terminal is able to determine whether or not frame-level timing is required for the base station.

In another embodiment, the identities of the synchronous base stations are provided by the system to the terminal via an Information Element (IE) defined in the W-CDMA standard (Document No. 3GPP TS 25.331, Section 10.3.7.106, entitled "UE Positioning OTDOA Neighbour Cell Info"). The Information Element provides approximate cell timing as well as the cell locations and fine cell timing. Specifically, the Information Element provides the SFN-SFN of the neighbor cell with a resolution of $1/16$ of a chip and a range of [0 . . . 38,399] chips, and further provides the SFN-SFN drift. In general, the Information Element may be used by the terminal to reduce the search space and, in particular, to estimate which base stations are synchronized. In accordance with the current W-CDMA standard, the Information Element is sent via the measurement control message to OTDOA-capable terminals when operating in a dedicated mode, or via the System Information message to all terminals in the cell, and is used to assist the terminals to perform position location. In an embodiment, this information may be provided and used to narrow the search space of neighbor cell signals for position location measurements as well as for measurements used for hard and soft handovers.

In yet another embodiment, the identities of synchronous base stations are provided by the system via broadcast messages transmitted on a common channel (e.g., the broadcast channel). The broadcast messages can include a list of synchronous base stations for which it is not necessary to report the frame-level timing. Alternatively, the broadcast messages can include a list of asynchronous base stations for which it is necessary to report the frame-level timing. In yet another embodiment, the identities of the synchronous and/or asynchronous base stations are transmitted via a dedicated channel or some other channel to the terminal.

In yet another embodiment, the identities of the synchronous and/or asynchronous base stations are provided to the terminal a priori, prior to the request for the time difference measurements. For example, this information may be provided during a call set-up or may be stored in the terminal via some previous communication or transaction.

Upon receiving the identities of the synchronous and/or asynchronous base stations, the terminal knows that there may be no need to recover the SFN values for some or all of the base stations. For each base station for which frame-level timing is not required, the terminal can measure only the chip-level time difference between that base station and the reference base station with respect to a common frame boundary and report only the chip-level timing. The frame-level timing can be set to the predetermined value. If the predetermined value is zero, then the reported value for the SFN-SFN type 1 measurement would fall within a reduced range of [0 . . . 38,399] chips, or one frame.

Figure 3A:
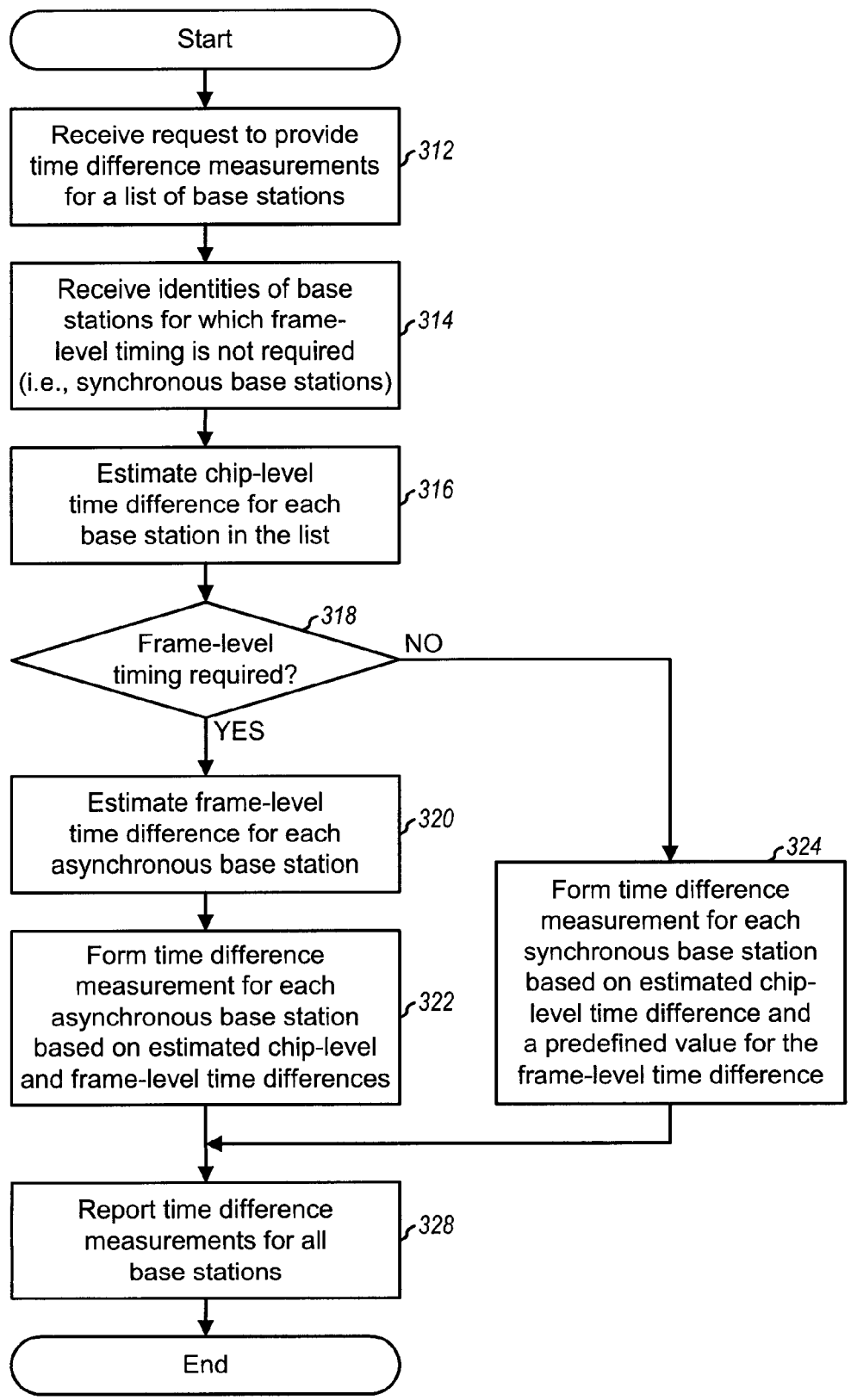
FIGS. 3A through 3C are flow diagrams of a process to determine time differences for a number of base stations, in accordance with three different embodiments of the invention.

FIG. 3A is a flow diagram of a process to measure and report time difference measurements, in accordance with an embodiment of the invention. This process implements the first time-alignment scheme described above. Initially, the terminal receives a request to provide time difference measurements for a list of base stations, at step 312. This request may be sent by the system for a particular function, such as for soft and hard handovers, position determination, and so on. This request may also be generated internally by the terminal, for example, based on the occurrence of a particular event, the fulfillment of a particular condition, periodically as determined by a timer, and so on.

In an embodiment, the request specifically identifies the base stations for which the time difference measurements are desired. In an alternative embodiment, the terminal determines the time difference for a list of base stations identified as being received by the terminal. For this embodiment, a base station may be deemed as being received by the terminal if it meets one or more requirements, such as the received signal quality being greater than or equal to a particular threshold. The received base stations would then be included in the list of base stations for which time difference measurements are reported.

The terminal also receives the identities of base stations for which frame-level timing is not required, at step 314. These base stations may simply be denoted as synchronous base stations, and all other base stations may then be denoted as asynchronous base stations. The list of base stations for which time difference measurements are desired may include any number of (zero or more) synchronous base stations and any number of (zero or more) asynchronous base stations. The information identifying the synchronous and/or asynchronous base stations may be provided to the terminal via various means such as (1) sent specifically to the terminal via the request for time difference measurements, (2) broadcast to the terminal via signaling on the broadcast channel, (3) provided to the terminal during a call set-up, (4) stored within the terminal by a previous action, or (5) made available to the terminal via some other means.

In response to the request, the terminal estimates the chip-level time difference for each base station in the list, at step 316. The chip-level time difference may be determined for each base station relative to the timing of the reference base station, which is a specific base station in the terminal's active set and is known to both the system and the terminal.

For each base station in the list, a determination is then made whether or not frame-level timing is required for the base station, at step 318. This can be performed by checking whether the base station is synchronous or asynchronous. If frame-level timing is required, then the terminal estimates the frame-level time difference for the base station, at step 320. This may be performed by demodulating and decoding a common channel (e.g., the broadcast channel) from the base station to retrieve the system frame number, as described above. For each asynchronous base station, a time difference measurement is then formed based on the estimated chip-level and frame-level time differences, at step 322. And for each synchronous base station for which frame-level timing is not required, a time difference measurement is formed for the base station based on the estimated chip-level time difference and the predetermined value (e.g., zero), at step 324.

The time difference measurements for all base stations in the list (i.e., both synchronous and asynchronous base stations) are then reported to the system, at step 328. In an embodiment, the time difference measurements for all base stations are encapsulated into an SFN-SFN type 1 measurement report message, which is then sent to the system. The system receives the report message and adjusts the timing of the data transmission from each selected base station to the terminal based on the time difference estimated for the selected base station. The process then terminates.

The first time-alignment scheme may be used for all configurations in which the frame-level timing is already known by the system and does not need to be measured and reported. This scheme is particular well suited for synchronous system configurations such as those shown in FIGS. 2A through 2C. In system configurations S2 and S3, the actual value of the frame-level time difference may be a non-zero value. However, the terminal reports the predetermined value (e.g., zero) for the frame-level part of the SFN-SFN type 1 measurement. The possibly erroneous reported value for the frame-level part does not affect the ability of the system to add new candidate base stations to the terminal's active set since the actual frame difference (if it is a non-zero value) is a constant value that is already known by the system.

The first time-alignment scheme provides numerous advantages. First, the terminal does not need to demodulate and decode the broadcast channel to recover the system frame number of a candidate base station when this information is not required. This ameliorates the disadvantages noted above (i.e., smaller handover region and additional demodulation delays). Second, by setting the frame-level part to the predetermined value, the length of the SFN-SFN type 1 measurement message is not affected by whether or not "valid" frame-level information is included in the message.

The first time-alignment scheme uses the SFN-SFN type 1 measurement report message, as defined by the W-CDMA standard, and allows the terminal to report only the chip-level time difference if the frame-level timing is already known to the system. The system has the capability to broadcast such information, as currently defined by the W-CDMA standard. With this information, the terminal would not need to process and recover the broadcast channel to recover the SFN since the terminal can set the frame-level part for the SFN-SFN type 1 measurement to the predetermined value. However, the terminal would still send the SFN-SFN type 1 measurement message as a number encoded with 24 bits (since the maximum range of SFN-SFN type 1 measurement is [0 . . . 9,830,399] chips), which would however have a reduced range of [0 . . . 38399] chips (the eight most significant bits are set to zero).

In a second time-alignment scheme, the time difference between two base stations is determined by a terminal based on partial decoding of some of the base stations received by the terminal. For this scheme, the terminal initially processes the downlink signals transmitted from the base stations to detect their presence. The terminal further decodes the primary common control channel (P-CCPCH) for a number of base stations, which may be selected based on a particular criterion. For example, the base stations whose received signal strengths are above a particular threshold (i.e., strong enough to be decoded) may be selected for decoding, starting with the strongest received base station. In an embodiment, if two or more decoded base stations have the same SFN value at a particular time instance, then a synchronous system configuration with time-aligned frame start (i.e., configuration S1 shown in FIG. 2A) can be deduced. The terminal can then hypothesize that the other (weaker received and undecoded) base stations also have the same SFN value, and can report the predetermined value for the frame-level part of the SFN-SFN type 1 measurements for these "hypothesized" base stations.

Figure 3B:
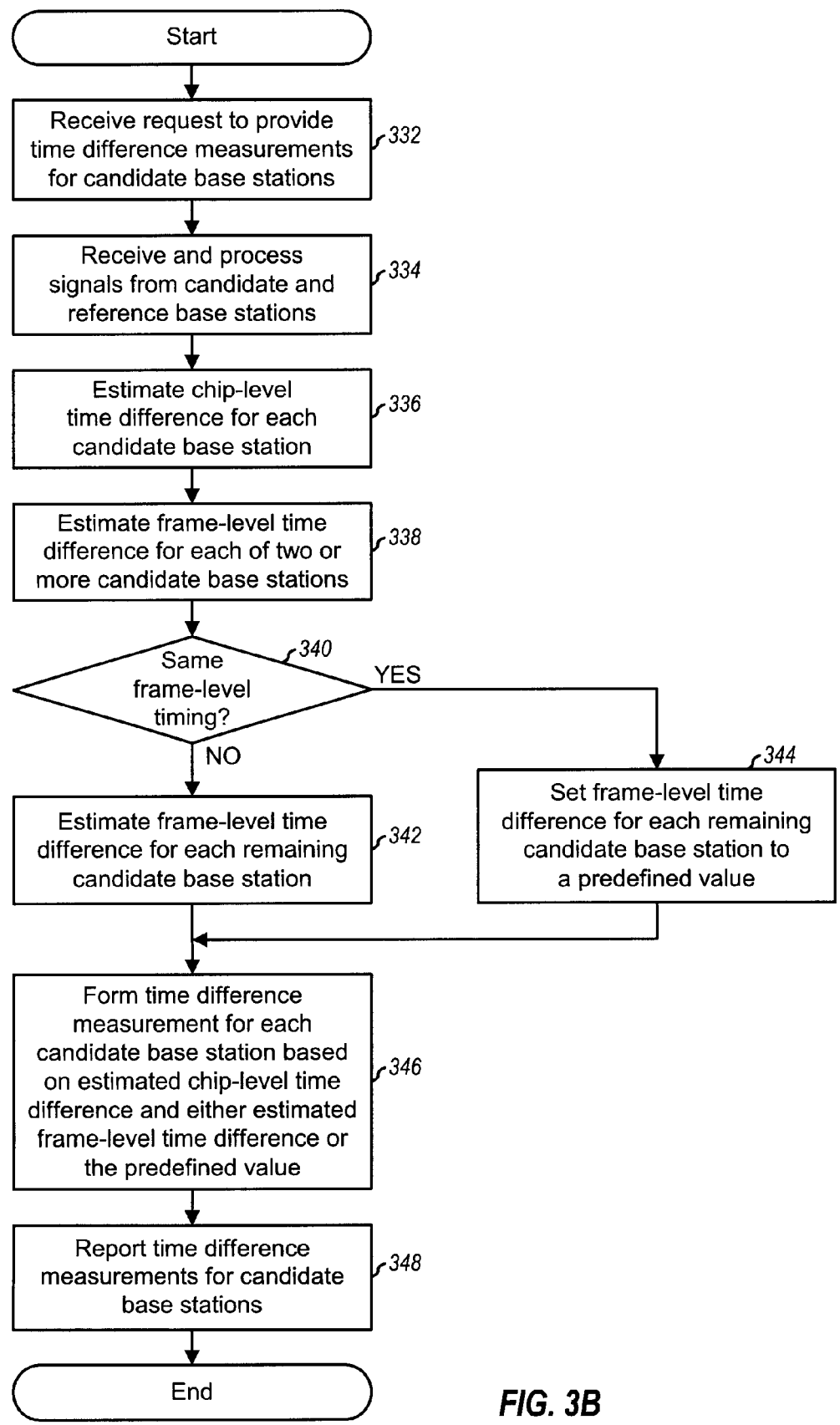

FIG. 3B is a flow diagram of a process to measure and report time difference measurements, in accordance with another embodiment of the invention. This process implements the second time-alignment scheme. Initially, the terminal receives a request to provide time difference measurements for a number of candidate base stations, at step 332. The terminal then receives and processes the downlink signals from the candidate and reference base stations, at step 334.

For each candidate base station, the terminal estimates the chip-level time difference, e.g., in a manner described above, at step 336. The terminal also estimates the frame-level time differences for two or more candidate base stations, at step 338. A determination is then made whether or not the estimated frame-level timing is the same for the two or more candidate base stations, at step 340. If the frame-level timing is the same, then the terminal assumes a synchronous system configuration with time-aligned frame start and consequently sets the frame-level time difference for each remaining candidate base station to the predetermined value, at step 344. Otherwise, if the frame-level timing is not the same at step 340, the frame-level time difference for each remaining candidate base station is estimated, at step 342.

For each candidate base station, a time difference measurement is then formed based on the estimated chip-level time difference and either the estimated frame-level time difference or the predetermined value, at step 346. The time difference measurements for the candidate base stations are then reported to the system, at step 348. The system receives the reported time differences and adjusts the timing of the data transmission from each selected base station to the terminal based on the time difference estimated for the selected base station. The process then terminates.

The second time-alignment scheme can provide sufficiently accurate time difference measurements for system configuration S1 shown in FIG. 2A, which is more likely to be deployed by the network operator than the other system configurations shown in FIGS. 2B through 2D.

Since there is no guarantee that all base stations are synchronized if some of them are synchronized, and also for instances in which the same SFN value is coincidentally obtained at a particular time instance, a mechanism may be provided to bypass this scheme and implement some other scheme to provide the required frame-level timing. For example, a message may be sent to the terminal if the reported measurements do not match a profile for the reported base stations. Alternatively, the terminal may determine later that it is not able to decode the radio frames from a hypothesized base station because the timing has been adjusted to the wrong value. In any case, upon receiving an indication that a previously reported time difference measurement is erroneous because of an incorrect hypothesis, the terminal may perform a complete SFN-SFN type 1 measurement and decode the P-CCPCH for the hypothesized base station to obtain the actual frame-level timing.

In a third time-alignment scheme, the timing for a terminal is ascertained by the base stations based on an uplink transmission from the terminal. The recovered timing information may then be used to adjust the timing of the downlink transmissions to the terminal.

In an embodiment, the base stations that are not in the terminal's active set but are in the neighborhood of the terminal (i.e., neighbor base stations) may be instructed by the system to measure the uplink transmission from the terminal (e.g., a transmission on the uplink dedicated physical channel (DPCH)). If the neighbor base stations are able to receive the uplink transmission with sufficient strength, then they can accurately estimate the arrival time of the uplink transmission. Based on the estimated signal arrival times from the neighbor base stations and a priori knowledge of the time relation between common channel frames among the various active and neighbor base stations, the system can determine the proper timing for each neighbor base station that may be added to the terminal's active set such that the downlink transmission from the added base station is properly time-aligned at the terminal.

The third time-alignment scheme can be implemented based solely on measurements performed at the neighbor base stations. Each neighbor base station may be designed to include receiver processing units that search for and process the uplink transmissions from the terminals located in the neighboring cells. This scheme may be used for synchronous and asynchronous system configurations.

Figure 3C:
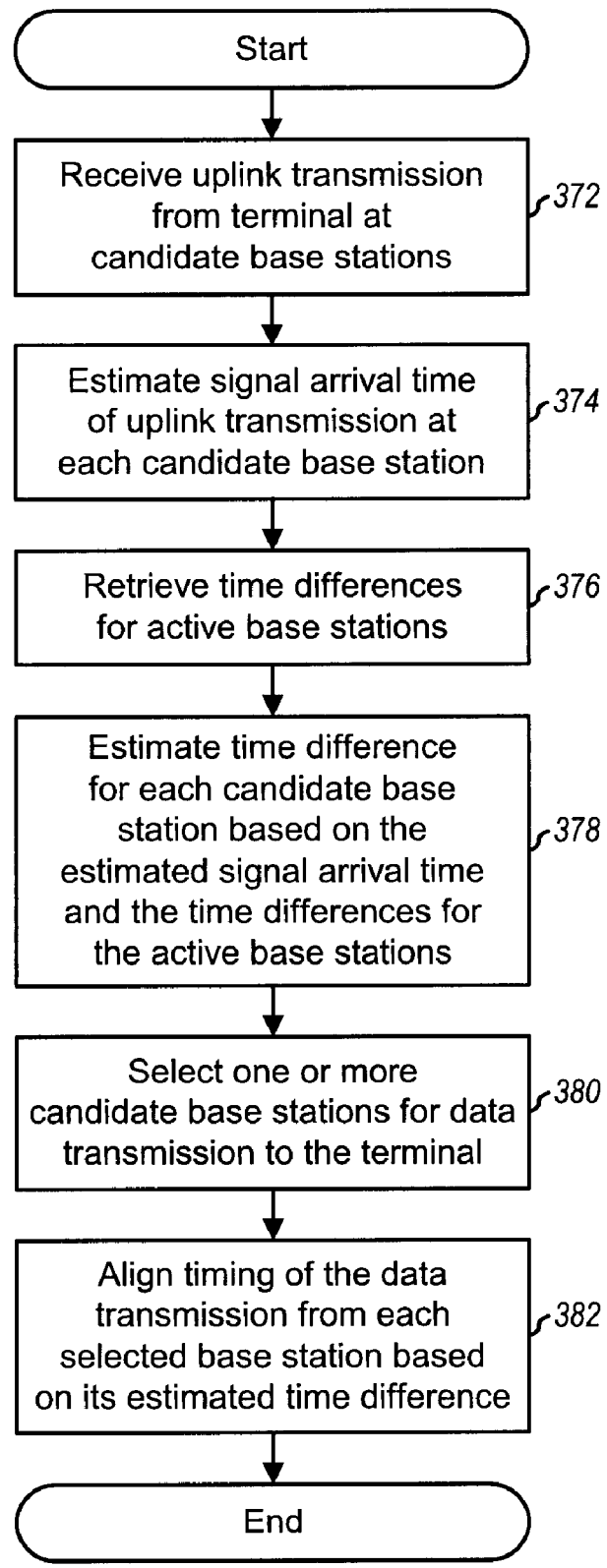

FIG. 3C is a flow diagram of a process to determine the timing for a terminal based on an uplink transmission, in accordance with yet another embodiment of the invention. This process implements the third time-alignment scheme. Initially, the candidate base stations receive the uplink transmission from the terminal, at step 372, and each candidate base station estimates the signal arrival time of the received uplink transmission, at step 374. The system then retrieves the time differences for active base stations (i.e., base stations in the active set of the terminal), at step 376. The difference between common channel frames may be known in the system for all the synchronous system configurations S1, S2, and S3.

The system then estimates the time difference for each candidate base station based on the signal arrival time estimated by the candidate base station and the time differences for the active base stations, at step 378. One or more candidate base stations may thereafter be selected for data transmission to the terminal, at step 380. In that case, the timing of the data transmission from each selected base station to the terminal is adjusted based on the time difference estimated for the selected base station, at step 382. The process then terminates.

The above-described techniques provide various advantages. First, when a terminal is handed over from a first base station to a second base station, the measurement of the SFN-SFN time difference between these base stations along with the round trip delay measurements (which may be performed by the first base station) allow the second base station to determine where to search for the terminal's uplink transmission. This mechanism is described by Chuck Wheatley in a paper entitled "Self-Synchronizing a CDMA Cellular Network," pages 320–328, Microwave Journal, May 1999, which is incorporated herein by reference. Second, the SFN-SFN time difference measurement may be used by the second base station to time-align its downlink transmission so that it is received by the terminal close in time to the downlink transmission from the first base station. Other benefits may also be realized by the use of the techniques described herein.

Figure 4:
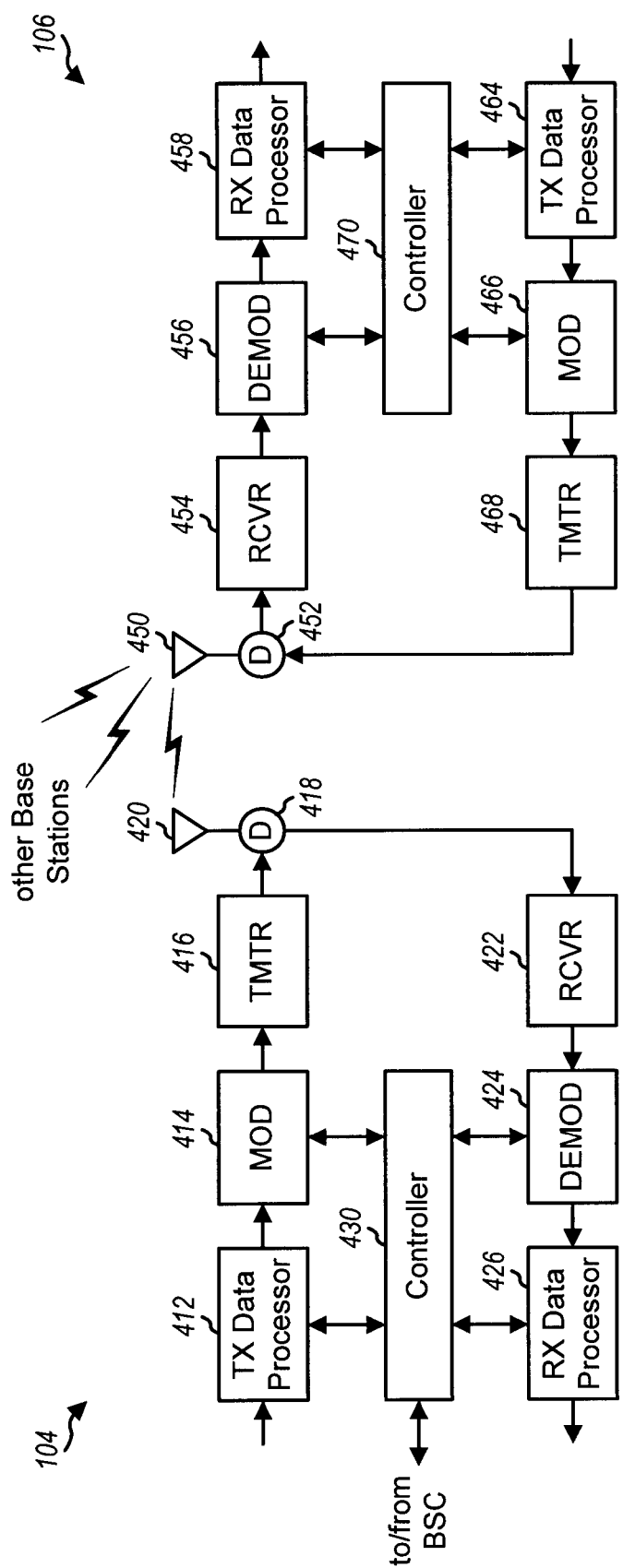
FIG. 4 is a simplified block diagram of an embodiment of a base station and a terminal.

FIG. 4 is a simplified block diagram of an embodiment of base station 104 and terminal 106, which are capable of implementing various aspects and embodiments of the invention. For simplicity, only one base station and one terminal are shown in FIG. 1. However, terminal 106 may concurrently communicate with multiple base stations 104 when in soft handover and may further receive messages from various other neighbor base stations.

On the downlink, at base station 104, user-specific data, signaling to identify synchronous and asynchronous base stations, and requests for time difference measurements are provided to a transmit (TX) data processor 412, which formats and encodes the data and messages based on one or more coding schemes to provide coded data. Each coding scheme may include any combination of cyclic redundancy check (CRC), convolutional, Turbo, block, and other coding, or no coding at all. Typically, data and messages are coded using different schemes, and different types of message may also be coded differently.

The coded data is then provided to a modulator (MOD) 414 and further processed to generate modulated data. The processing by modulator 414 may include (1) covering the coded data with orthogonal codes (e.g., orthogonal variable spreading factor (OVSF) codes) to channelize the user-specific data and messages into their respective dedicated and control channels and (2) scrambling the covered data with PN sequences assigned to the terminal. The modulated data is then provided to a transmitter unit (TMTR) 416 and conditioned (e.g., converted to one or more analog signals, amplified, filtered, and quadrature modulated) to generate a downlink modulated signal suitable for transmission over a wireless link. The downlink modulated signal is then routed through a duplexer (D) 418 and transmitted via an antenna 420 to the terminals.

At terminal 106, the downlink modulated signal is received by an antenna 450, routed through a duplexer 452, and provided to a receiver unit (RCVR) 454. Receiver unit 454 conditions (e.g., filters, amplifies, downconverts, and digitizes) the received signal and provides samples. A demodulator (DEMOD) 456 then receives and processes the samples to provide recovered symbols. The processing by demodulator 456 includes despreading the samples with PN sequences aligned to the signal arrival times of the multi-paths being processed, decovering the despread samples to channelize the received data and messages into their respective dedicated and control channels, and (coherently) demodulating the decovered data with a recovered pilot. Demodulator 456 may implement a rake receiver that can process multiple instances of the received signal and combines symbols from various multipaths belonging to the same base station to provide the recovered symbols.

A receive (RX) data processor 458 then decodes the recovered symbols to recover the user-specific data and messages transmitted on the downlink. The recovered messages may be provided to a controller 470. The processing by demodulator 456 and RX data processor 458 is complementary to that performed by modulator 414 and TX data processor 412 at base station 104, respectively.

Demodulator 456 may further be operated to determine the signal arrival times of the received base stations (e.g., based on the timing of the PN sequences generated by the terminal) and to derive the chip-level time difference between two base stations based on the signal arrival times, as directed by controller 470. Alternatively, the signal arrival times may be determined by demodulator 456 and provided to controller 470, which can then determine the chip-level time difference. RX data processor 458 may further be operated to recover and provide the system frame numbers for the common channel frames for one or more received base stations (e.g., the candidate and reference base stations), as directed by controller 470. Controller 470 can then determine the frame-level time difference, if and as necessary.

Controller 470 may receive information regarding which base stations require frame-level timing and which do not, and may further receive the request for time difference measurements. Controller 470 then directs demodulator 456 to provide the chip-level timing information for the received base stations and further directs RX data processor 458 to provide the frame-level timing information for certain base stations for which such information is required. Controller 470 then forms an SFN-SFN type 1 measurement report message for the received base stations.

On the uplink, at terminal 106, the SFN-SFN type 1 measurement report message is provided to a TX data processor 464, which then processes the report message in accordance with a defined processing scheme. The processed message is then further processed (e.g., covered and spread) by a modulator (MOD) 466 and conditioned by a transmitter unit (TMTR) 468 to generate an uplink modulated signal, which is then routed through duplexer (D) 452 and transmitted via antenna 450 to the base stations.

At base station 104, the uplink modulated signal is received by antenna 420, routed through duplexer 418, and provided to a receiver unit (RCVR) 422. Receiver unit 422 conditions the received signal and provides samples. The samples are then processed (e.g., despread, decovered, and demodulated) by a demodulator (DEMOD) 424 and decoded (if necessary) by an RX data processor 426 to recover the transmitted report message. The recovered report message is then provided to a controller 430, which may forward the report message to a base station controller (BSC) or some other system entity. The signal strength and time difference information included in the report message may be used to select one or more base stations for inclusion in the terminal's active set and to properly time-align the downlink transmissions from the selected base stations.

The elements of terminal 106 and base station 104 may be designed to implement various aspects of the invention, as described above. The elements of the terminal or base station may be implemented with a digital signal processor (DSP), an application specific integrated circuit (ASIC), a processor, a microprocessor, a controller, a microcontroller, a field programmable gate array (FPGA), a programmable logic device, other electronic units, or any combination thereof. Some of the functions and processing described herein may also be implemented with software executed on a processor. For example, the estimation of the chip-level and frame-level time differences and the encapsulation of the time difference measurements into the SFN-SFN type 1 measurement report message may be performed by controller 470.

For clarity, various aspects, embodiments, and schemes have been described specifically for the SFN-SFN type 1 measurement in the W-CDMA standard. The frame-level timing and chip-level timing may also be reported via other mechanisms. For example, W-CDMA supports the reporting of a parameter Tm for chip-level timing, and parameters OFF and COUNT-C-SFN for frame-level timing. These parameters are described in further detail in Document No. 3GPP TS 25.402, Section 5, which is incorporated herein by reference.

The techniques described herein may also be applied to other communication systems in which the time difference may be partitioned into two or more parts having different resolutions and/or pertaining to different measurement types. In the above, the time difference is partitioned into the chip-level and frame-level parts. For some other systems, the time difference may be partitioned into a fine-resolution part and a coarse-resolution part. The time difference may also be partitioned in some other manner for some other systems. For each of these cases, the measurement may be performed for only the required part or parts, and a predetermined or default value may be used for each non-required part.

Headings are included herein for reference and to aid in locating certain sections. These headings are not intended to limit the scope of the concepts described therein, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for determining differences in timing between a plurality of base stations in a wireless communication system, each one of the plurality of base stations operating either synchronously or asynchronously, the method comprising:
   receiving a request for time difference measurements between the plurality of base stations, the time difference measurements including a first part indicative of a chip-level time difference and a second part indicative of a frame-level time difference;
   estimating the chip-level time difference for each of the plurality of base stations based on received downlink signals transmitted therefrom;
   determining whether frame-level timing is needed for each of the plurality of base stations;
   determining time difference measurements for the base stations operated synchronously based on the estimated chip-level time difference and a predefined value provided that the frame-level timing is not needed;
   estimating the frame-level time difference for the base stations operated asynchronously; and
   determining time difference measurements for the base stations operated asynchronously based on the estimated chip-level time difference and the estimated frame-level time difference provided that the frame-level timing is needed.

2. The method of claim 1, further comprising:
   receiving an indication identifying each of the plurality of base stations as operating synchronously.

3. The method of claim 2, wherein said receiving an indication identifying each of the plurality of base stations as operating synchronously is included in the request.

4. The method of claim 2, wherein said receiving an indication identifying each of the plurality of base stations as operating synchronously is based on a Read SFN system frame number Indicator defined by a W-CDMA wide-band code division multiple access standard.

5. The method of claim 2, wherein said receiving an indication identifying each of the plurality of base stations as operating synchronously is received via a common channel.

6. The method of claim 2, wherein said receiving an indication identifying each of the plurality of base stations as operating synchronously is received via a dedicated channel.

7. The method of claim 1, wherein said determining time difference measurements for the base stations operated synchronously is based on the estimated chip-level time difference.

8. The method of claim 1, wherein said estimating the chip-level time difference is based on time offsets of pseudo-noise (PN) sequences used to descramble the downlink signals.

9. The method of claim 1, wherein said estimating the frame-level time difference is based on recovered radio frames transmitted on common channels from the plurality of base stations.

10. The method of claim 1, further comprising:
    encapsulating the time difference measurements for the plurality of base stations in an SFN-SFN type 1 measurement report message defined by a W-CDMA standard.

11. The method of claim 1, further comprising:
reporting the determined time difference measurements for the base stations operated synchronously or asynchronously.

12. The method of claim 11, wherein said reporting the determined time difference measurements includes the chip-level time difference being reported via a parameter Tm defined by a W-CDMA standard.

13. The method of claim 11, wherein said reporting the determined time difference measurements includes the frame-level time difference being reported via parameters OFF and COUNT-C-SFN defined by a W-CDMA standard.

14. The method of claim 1, further comprising:
aligning a timing for data transmission from each of the plurality of base stations based upon the determined time difference measurements.

15. An apparatus for determining differences in timing between a plurality of base stations in a wireless communication system, each one of the plurality of base stations operating either synchronously or asynchronously, comprising:
means for receiving a request for time difference measurements between the plurality of base stations, the time difference measurements including a first part indicative of a chip-level time difference and a second part indicative of a frame-level time difference;
means for estimating the chip-level time difference for each of the plurality of base stations based on received downlink signals transmitted therefrom;
means for determining whether frame-level timing is needed for each of the plurality of base stations;
means for determining time difference measurements for the base stations operated synchronously based on the estimated chip-level time difference and a predefined value provided that the frame-level timing is not needed;
means for estimating the frame-level time difference for the base stations operated asynchronously; and
means for determining time difference measurements for the base stations operated asynchronously based on the estimated chip-level time difference and the estimated frame-level time difference provided that the frame-level timing is needed.

16. The apparatus of claim 15, further comprising:
means for receiving an indication identifying each of the plurality of base stations as operating synchronously.

17. The apparatus of claim 16, wherein said means for receiving an indication identifying each of the plurality of base stations as operating synchronously is included in the request.

18. The apparatus of claim 16, wherein said means for receiving an indication identifying each of the plurality of base stations as operating synchronously is based on a Read SFN Indicator defined by a W-CDMA standard.

19. The apparatus of claim 16, wherein said means for receiving an indication identifying each of the plurality of base stations as operating synchronously is received via a common channel.

20. The apparatus of claim 16, wherein said means for receiving an indication identifying each of the plurality of base stations as operating synchronously is received via a dedicated channel.

21. The apparatus of claim 15, wherein said means for determining time difference measurements for the base stations operated synchronously is based on the estimated chip-level time difference.

22. The apparatus of claim 15, wherein said means for estimating the chip-level time difference is based on time offsets of pseudo-noise (PN) sequences used to descramble the downlink signals.

23. The apparatus of claim 15, wherein said means for estimating the frame-level time difference is based on recovered radio frames transmitted on common channels from the plurality of base stations.

24. The apparatus of claim 15, further comprising:
means for encapsulating the time difference measurements for the plurality of base stations in an SFN-SFN type 1 measurement report message defined by a W-CDMA standard.

25. The apparatus of claim 15, further comprising:
means for reporting the determined time difference measurements for the base stations operated synchronously or asynchronously.

26. The apparatus of claim 15, wherein said means for reporting the determined time difference measurements includes the chip-level time difference being reported via a parameter Tm defined by a W-CDMA standard.

27. The apparatus of claim 15, said means for reporting the determined time difference measurements includes the frame-level time difference being reported via parameters OFF and COUNT-C-SFN defined by a W-CDMA standard.

28. The apparatus of claim 15, further comprising:
means for aligning a timing for data transmission from each of the plurality of base stations based upon the determined time difference measurements.

29. A communications system, comprising:
a plurality of base stations, each one of the plurality of base stations operating either synchronously or asynchronously;
at least one terminal to receive a request for time difference measurements between the plurality of base stations, the time difference measurements including a first part indicative of a chip-level time difference and a second part indicative of a frame-level time difference, estimate the chip-level time difference for each of the plurality of base stations based on received downlink signals transmitted therefrom, determine whether frame-level timing is needed for each of the plurality of base stations, determine time difference measurements for the base stations operated synchronously based on the estimated chip-level time difference and a predefined value provided that frame-level timing is not needed, estimate the frame-level time difference for the base stations operated asynchronously, and determine time difference measurements for the base stations operated asynchronously based on the estimated chip-level time difference and the estimated frame-level time difference provided that frame-level timing is needed.

30. The system of claim 29, wherein said terminal receives an indication identifying each of the plurality of base stations as operating synchronously.

31. The system of claim 30, wherein said terminal receives an indication identifying each of the plurality of base stations as operating synchronously is included in the request.

32. The system of claim 30, wherein said terminal receiving an indication identifying each of the plurality of base stations as operating synchronously is based on a Read SFN Indicator defined by a W-CDMA standard.

33. The system of claim 30, wherein said terminal receiving an indication identifying each of the plurality of base stations as operating synchronously is received via a common channel.

34. The system of claim 30, wherein said terminal receiving an indication identifying each of the plurality of base stations as operating synchronously is received via a dedicated channel.

35. The system of claim 29, wherein said terminal determining time difference measurements for the base stations operated synchronously is based on the estimated chip-level time difference.

36. The system of claim 29, wherein said terminal estimating the chip-level time difference is based on time offsets of pseudo-noise (PN) sequences used to descramble the downlink signals.

37. The system of claim 29, wherein said terminal estimating the frame-level time difference is based on recovered radio frames transmitted on common channels from the plurality of base stations.

38. The system of claim 29, wherein said terminal encapsulates the time difference measurements for the plurality of base stations in an SFN-SFN type 1 measurement report message defined by a W-CDMA standard.

39. The system of claim 29, wherein said terminal reports the determined time difference measurements for the base stations operated synchronously or asynchronously.

40. The system of claim 29, wherein said terminal reporting the determined time difference measurements includes the chip-level time difference being reported via a parameter Tm defined by a W-CDMA standard.

41. The system of claim 29, wherein said terminal reporting the determined time difference measurements includes the frame-level time difference being reported via parameters OFF and COUNT-C-SFN defined by a W-CDMA standard.

42. The system of claim 29, wherein said terminal aligns a timing for data transmission from each of the plurality of base stations based upon the determined time difference measurements.

* * * * *